United States Patent
Ohde (10) Patent No.: US 8,787,724 B2
(45) Date of Patent: Jul. 22, 2014

(54) INFORMATION PROCESSING APPARATUS, INFORMATION PROCESSING METHOD AND PROGRAM

(75) Inventor: Junya Ohde, Ibaraki (JP)

(73) Assignee: Sony Corporation, Tokyo (JP)

( * ) Notice: Subject to any disclaimer, the term of this patent is extended or adjusted under 35 U.S.C. 154(b) by 918 days.

(21) Appl. No.: 12/195,453

(22) Filed: Aug. 21, 2008

(65) Prior Publication Data

US 2009/0052864 A1    Feb. 26, 2009

(30) Foreign Application Priority Data

Aug. 23, 2007 (JP) ................................. 2007-217229

(51) Int. Cl.
*H04K 1/00* (2006.01)
*H04L 9/00* (2006.01)

(52) U.S. Cl.
USPC ............. 386/83; 386/248; 386/262; 386/291; 386/296; 386/297

(58) Field of Classification Search
USPC ..................... 386/83, 248, 262, 291, 296–297
See application file for complete search history.

(56) References Cited

U.S. PATENT DOCUMENTS

| | | | | |
|---|---|---|---|---|
| 6,934,964 | B1 * | 8/2005 | Schaffer et al. | 725/46 |
| 7,051,352 | B1 * | 5/2006 | Schaffer | 725/39 |
| 2002/0193066 | A1 * | 12/2002 | Connelly | 455/2.01 |
| 2003/0156826 | A1 | 8/2003 | Sonoda et al. | |
| 2003/0193619 | A1 * | 10/2003 | Farrand | 348/731 |
| 2004/0003403 | A1 * | 1/2004 | Marsh | 725/53 |
| 2004/0060063 | A1 * | 3/2004 | Russ et al. | 725/46 |
| 2004/0203639 | A1 * | 10/2004 | Ozer et al. | 455/414.1 |
| 2004/0254957 | A1 * | 12/2004 | Hyotyniemi et al. | 707/104.1 |
| 2005/0278742 | A1 * | 12/2005 | Komar | 725/46 |
| 2006/0020962 | A1 * | 1/2006 | Stark et al. | 725/32 |
| 2006/0101490 | A1 * | 5/2006 | Leurs | 725/45 |
| 2008/0059884 | A1 * | 3/2008 | Ellis et al. | 715/721 |
| 2008/0112690 | A1 * | 5/2008 | Shahraray et al. | 386/124 |

FOREIGN PATENT DOCUMENTS

| | | |
|---|---|---|
| EP | 1 383 325 | 1/2004 |
| EP | 1 420 591 | 5/2004 |
| GB | 2 352 920 | 2/2001 |
| JP | 2002-374462 | 12/2002 |
| JP | 2003-189216 | 7/2003 |
| JP | 2007-202181 | 8/2007 |
| WO | WO 00 40012 | 7/2000 |

* cited by examiner

*Primary Examiner* — Carl Colin
*Assistant Examiner* — John Elmore
(74) *Attorney, Agent, or Firm* — Wolf, Greenfield & Sacks, P.C.

(57) ABSTRACT

An information processing apparatus which presents a viewing schedule of a video content to a user is disclosed. The apparatus includes: a first acquiring means for acquiring a broadcast schedule of a broadcast content to be broadcast; a second acquiring means for acquiring information about a recorded content that has been recorded and an on-demand content that has been downloaded; a generating means for arranging the broadcast content, the recorded content, and the on-demand content on a same time axis as these contents are mixed, and generating the viewing schedule; and a display control means for displaying the generated viewing schedule.

9 Claims, 11 Drawing Sheets

FIG. 2

FIG. 4A
<TASTE VALUE TIME>

FIG. 4B
<TASTE VALUE KW>

FIG. 4C
<TASTE VALUE GENRE>

|  | MON. SEPTEMBER 1 | TUE. SEPTEMBER 2 | ... | FRI. SEPTEMBER 5 | SAT. SEPTEMBER 6 | MON. SEPTEMBER 7 |
|---|---|---|---|---|---|---|
| 08:00 | SEP. 1: REAL "FIRST NEWS IN THE MORNING" | SEP. 2: REAL "FIRST NEWS IN THE MORNING" | | SEP. 5: REAL "FIRST NEWS IN THE MORNING" | | AUG. 15: RECORD "DRAMA Z" |
| 09:00 | | | | | | |
| 10:00 | | | | | SEP. 6: REAL PRINCE'S BRUNCH | |
| ... | | | | | | |
| 20:00 | SEP. 1: REAL "DRAMA A" | SEP. 2: REAL "TUESDAY CINEMA" | | | SEP. 6: REAL "COMEDY M" | SEP. 7: HIGHLY RECOMMENDED "DYNAMIC PERIOD DRAMA" |
| 21:00 | | | | | | |
| 22:00 | | | | | | |
| 23:00 | AUG. 24: RECORD "DRAMA X" | AUG. 25: RECORD "DRAMA Y" | | VOD "YOUTH DRAMA 1" | VOD: HIGH RANKING "DOCUMENT α" | |
| 24:00 | | | | VOD "YOUTH DRAMA 2" | | |

| Time | MON. SEPTEMBER 1 | TUE. SEPTEMBER 2 | WED. SEPTEMBER 3 | ... |
|---|---|---|---|---|
| ... | | | | |
| 08:00 | REAL "FIRST NEWS IN THE MORNING" | REAL "FIRST NEWS IN THE MORNING" | REAL "FIRST NEWS IN THE MORNING" | |
| 09:00 | | | | |
| 10:00 | MEETING AT THE FIRST MEETING ROOM | | VACATION | |
| 11:00 | | | | |
| 12:00 | | PRESS RELEASE | | |
| 13:00 | | | | |
| ... | | | | |
| 23:00 | AUG. 24: RECORD "DRAMA X" | AUG. 25: RECORD "DRAMA Y" | VOD "FRENCH MOVIE SPECIAL" | |
| 24:00 | | | | |

90

INFORMATION PROCESSING APPARATUS, INFORMATION PROCESSING METHOD AND PROGRAM

CROSS REFERENCES TO RELATED APPLICATIONS

The present invention contains subject matter related to Japanese Patent Application JP 2007-217229 filed in the Japanese Patent Office on Aug. 23, 2007, the entire contents of which being incorporated herein by reference.

BACKGROUND OF THE INVENTION

1. Field of the Invention

The present invention relates to an information processing apparatus, an information processing method, and a program, particularly to an information processing apparatus, an information processing method, and a program, which estimate a time frame in which a user watches a content to be broadcast, a content already recorded, and a content to be downloaded in accordance with user's lifestyle, generate a viewing schedule based on the estimated result, and present it to a user.

2. Description of the Related Art

Heretofore, there is diversity in the types of video contents that can be watched with the use of a television set (display), and in addition to television programs being broadcast in real time, there are other contents such as contents of recorded television programs, contents downloaded on demand from a predetermined server over the Internet, and contents recorded on a recording medium such as a DVD.

Hereinafter, a television program broadcast in real time is referred to as a broadcast content, a content of a recorded television program is a recorded content, and a content downloaded on demand from a predetermined server over the Internet is an on-demand content. In addition, in the case in which the broadcast content, the recorded content, and the on-demand content are not distinguished from each other particularly, these contents are referred to as a video content, or simply a content.

In addition, there is a technique before in which attribute information about a broadcast content is read out of EPG data, for example, a broadcast content matched with a search condition such as a keyword and a genre registered in advance is retrieved to highlight and display the retrieved broadcast content on an electronic program guide or to give a predetermined mark to the retrieved broadcast content for display, whereby a user is recommended to watch the broadcast content (for example, see Patent Reference 1 (JP-A-H11-69316)).

Moreover, there is a technique in which a broadcast content matched with a search condition such as a keyword and a genre registered in advance is retrieved and automatically recorded, and the recorded contents are classified according to genres, or arranged in order of degree matched with user's favorites, whereby a user is recommended to watch the recorded content.

Furthermore, this scheme is also performed that popular contents (contents relatively frequently downloaded) in video on-demand services are made public, and a user is recommended to download the contents.

SUMMARY OF THE INVENTION

As described above, there are the techniques that individually recommend the broadcast content, the recorded content, or the on-demand content to a user. However, the broadcast content, the recorded content, and the on-demand content are common as any of video contents, but no method has been established yet which proposes these contents in an integrated manner.

In addition, no method has been established yet which proposes contents also including time periods to watch video contents.

Thus, it is desirable to decide and propose a viewing schedule of a broadcast content, a recorded content, and an on-demand content to a user in consideration of user's lifestyle.

According to an embodiment of the invention, there is provided an information processing apparatus which presents a viewing schedule of a video content to a user, and includes: a first acquiring means for acquiring a broadcast schedule of a broadcast content to be broadcast; a second acquiring means for acquiring information about a recorded content that has been recorded and an on-demand content that has been downloaded; a generating means for arranging the broadcast content, the recorded content, and the on-demand content on a same time axis as these contents are mixed, and generating the viewing schedule; and a display control means for displaying the generated viewing schedule.

The information processing apparatus according to the embodiment of the invention may further include: a collecting means for collecting user's viewing history; a taste value computing means for computing a taste value indicating user's viewing behavior in each of time frames based on the collected viewing history; and an evaluation value computing means for computing an evaluation value indicating a feature of the broadcast content, the recorded content, and the on-demand content wherein the generating means arranges the broadcast content, the recorded content, and the on-demand content in a time frame on the same time axis as these contents are mixed depending on a degree of similarity between the taste value and the evaluation value for each of time frames, and generates the viewing schedule.

In the information processing apparatus according to the embodiment of the invention, the display control means may display the generated viewing schedule in a two-dimensional matrix in which one of a vertical axis and a horizontal axis depicts a date, and the other depicts a time of day.

In the information processing apparatus according to the embodiment of the invention, the display control means may display the generated viewing schedule as virtual channels provided on a television program guide.

The information processing apparatus according to the embodiment of the invention may further include: a setting means for setting a recording preselect in response to a predetermined manipulation to the displayed viewing schedule.

According to another embodiment of the invention, there is provided an information processing method of an information processing apparatus which presents a viewing schedule of a video content to a user. The method includes the steps of: acquiring a broadcast schedule of a broadcast content to be broadcast; acquiring information about a recorded content that has been recorded and an on-demand content that has been downloaded; arranging the broadcast content, the recorded content, and the on-demand content on a same time axis as these contents are mixed, and generating the viewing schedule; and displaying the generated viewing schedule.

According to still another embodiment of the invention, there is provided a program for controlling an information processing apparatus which presents a viewing schedule of a video content to a user. The program allows a computer of the information processing apparatus to execute a process including the steps of: acquiring a broadcast schedule of a broadcast content to be broadcast; acquiring information about a recorded content that has been recorded and an on-demand content that has been downloaded; arranging the broadcast content, the recorded content, and the on-demand content on a same time axis as these contents are mixed, and generating the viewing schedule; and displaying the generated viewing schedule.

According to the embodiments of the invention, the broadcast content, the recorded content, and the on-demand content are arranged on the same time axis as these contents are mixed, and the viewing schedule is generated. Then, the generated viewing schedule is displayed.

According to the embodiments of the invention, a user can be recommended to watch a video content.

In addition, according to the embodiments of the invention, the viewing schedule of video contents can be proposed in consideration of user's lifestyle.

DETAILED DESCRIPTION OF THE INVENTION

Hereinafter, an embodiment of the invention will be described. The following is examples of the correspondence between configuration requirements for the invention and the embodiments of the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

Figure 2:
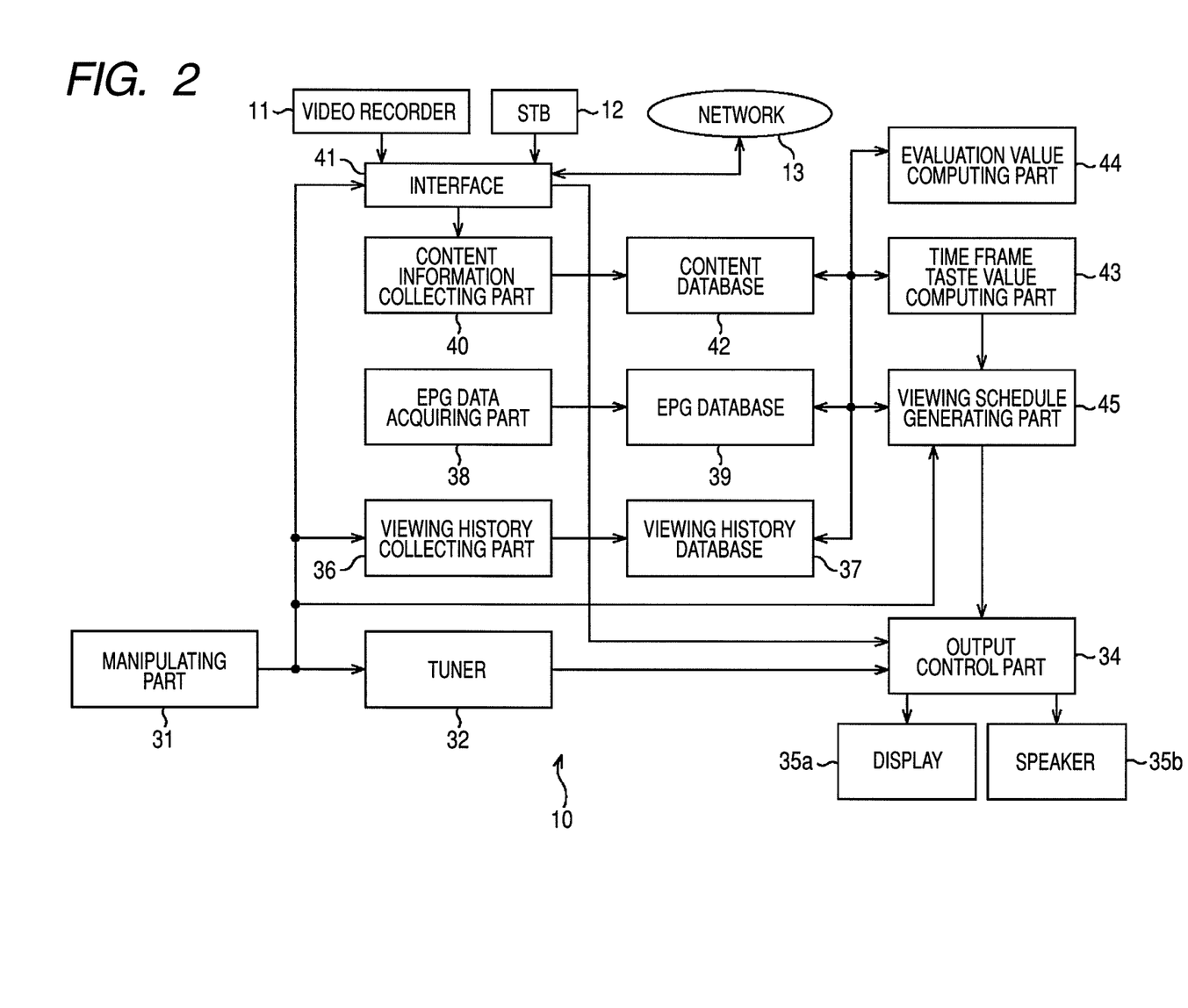
FIG. 2 shows a block diagram detailedly depicting an exemplary configuration of a television set shown in FIG. 1.

The information processing apparatus according to an embodiment of the invention is an information processing apparatus which presents a viewing schedule of a video content to a user (for example, a television set 10 shown in FIG. 2), and the apparatus includes: a first acquiring means for acquiring a broadcast schedule of a broadcast content to be broadcast (for example, an EPG data acquiring part 38 shown in FIG. 2); a second acquiring means for acquiring information about a recorded content that has been recorded and an on-demand content that has been downloaded (for example, a content information collecting part 40 shown in FIG. 2); a generating means for arranging the broadcast content, the recorded content, and the on-demand content on a same time axis as these contents are mixed, and generating the viewing schedule (for example, a viewing schedule generating part 45 shown in FIG. 2); and a display control means for displaying the generated viewing schedule (for example, an output control part 34 shown in FIG. 2).

Hereinafter, specific embodiments to which the invention is adapted will be described in detail with reference to the drawings.

Figure 1:
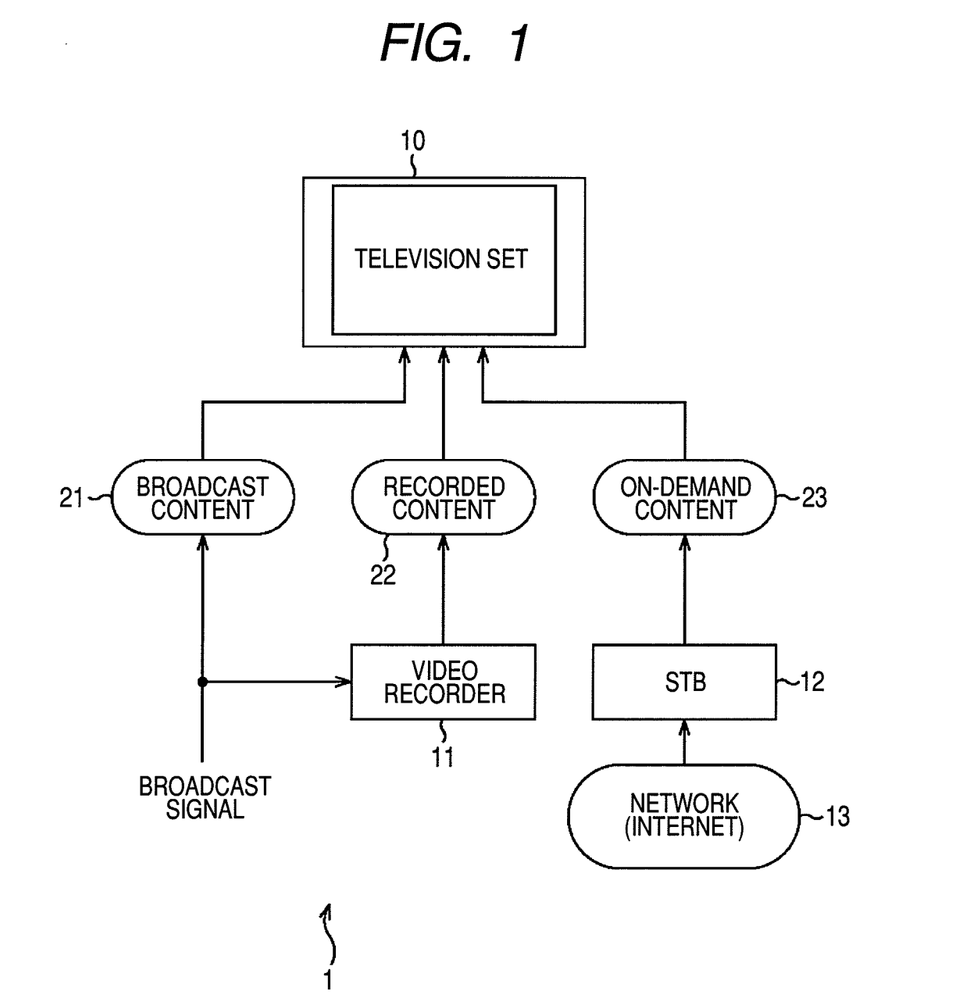
FIG. 1 shows a block diagram depicting an exemplary configuration of a content viewing system to which an embodiment of the invention is adapted.

FIG. 1 shows an exemplary configuration of a content viewing system which is an embodiment of the invention. The content viewing system 1 analyzes user's viewing behavior, and generates and displays a viewing schedule for proposing the timing of watching a video content to a user based on the analyzed result.

The content viewing system 1 is configured of a television set 10 that receives television broadcast signals, a video recorder 11 connected to the television set 10 for recording a television broadcast programs, and a STB (set top box) 12 that downloads video contents from a predetermined server over a network 13 typified by the Internet.

The television set 10 displays a video of a television program broadcast in real time (broadcast content 21) as well as outputs corresponding sounds. In addition, the television set 10 is configured to control the video recorder 11 connected thereto, and displays a video of a recorded content 22 that is recorded and reproduced by the video recorder 11 as well as outputs corresponding sounds. Moreover, the television set 10 is configured to control the connected STB 12, and displays a video of an on-demand content 23 downloaded and reproduced by the STB 12 as well as outputs corresponding sounds.

In addition, in the content viewing system 1 shown in FIG. 1, the television set 10, the video recorder 11, and the STB 12 are separate devices. However, for example, the television set 10, the video recorder 11, and the STB 12 may be combined as necessary, in such a combination that the television set 10 incorporates the video recorder 11 and the STB 12 therein.

Next, FIG. 2 shows an exemplary configuration of the television set 10 in detail.

In the television set 10, a manipulating part 31 generates and outputs manipulation signals corresponding to various manipulations inputted by a user. A tuner 32 receives a television broadcast in accordance with the manipulation signal from the manipulating part 31, and outputs a resulting broadcast content to an output control part 34.

The output control part 34 applies predetermined signal processing (such as image signal processing and sound signal processing) to a broadcast content inputted from the tuner 32, a recorded content inputted from the video recorder 11 through the interface 41, and an on-demand content inputted from the STB 12, displays the video on a display 35a, and outputs sounds from a speaker 35b. In addition, the output control part 34 displays a viewing schedule inputted from a viewing schedule generating part 45 on the display 35a.

Based on the manipulation signal generated by the manipulating part 31, a viewing history collecting part 36 monitors user manipulations (such as channel select manipulations to television broadcasts, recording preselect manipulations to television programs, manipulations of recording, reproduction and stop to the video recorder 11, and manipulations of download instructions, reproduction and stop to the STB 12), and notifies the viewing history database 37 about the type of video content (the categories of the broadcast content, the recorded content, and the on-demand content) at a predetermined sampling cycle (for example, a ten minute cycle).

Figure 3:
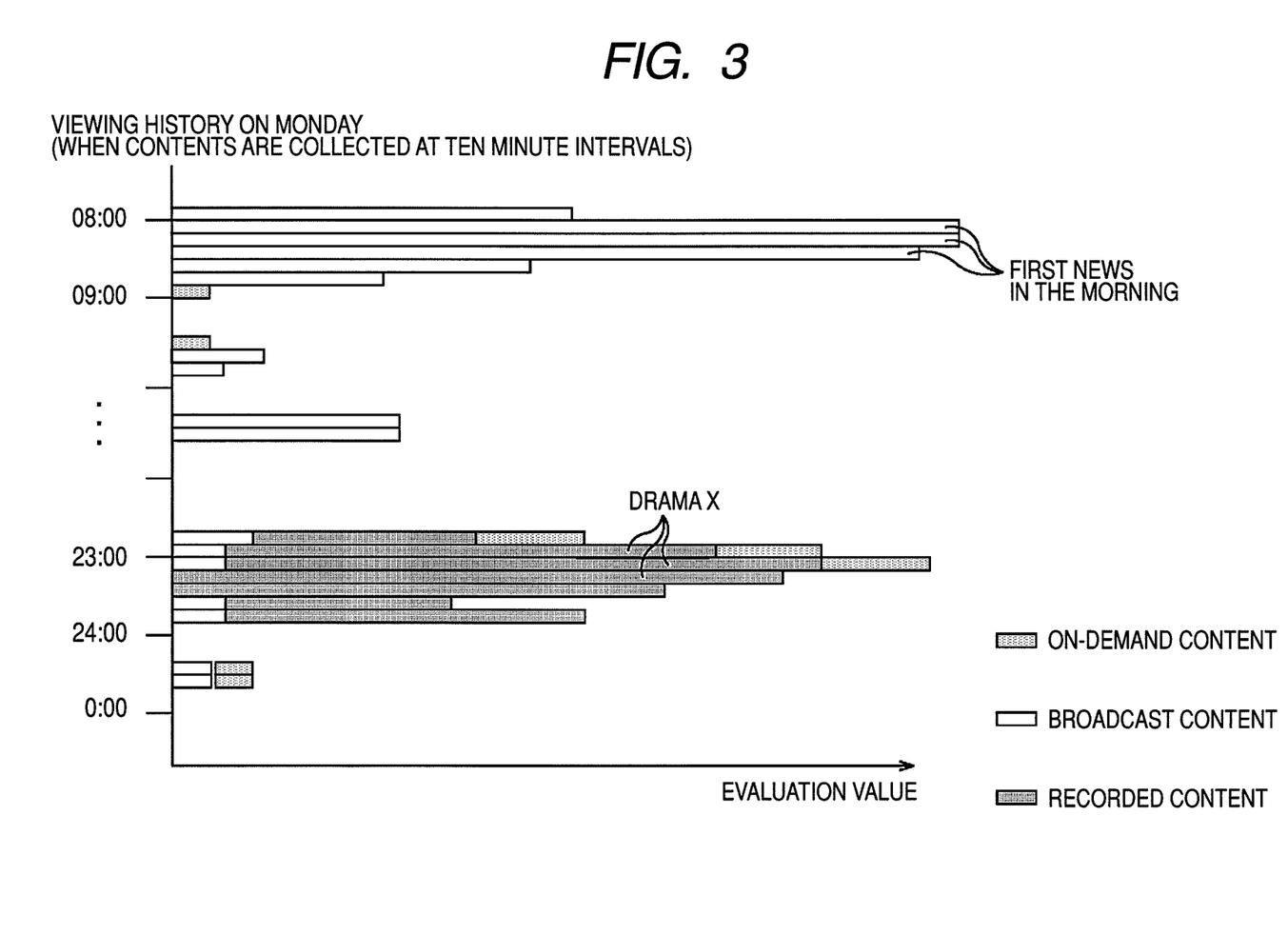
FIG. 3 shows a diagram depicting a classification image of video contents.
Figure 4A:
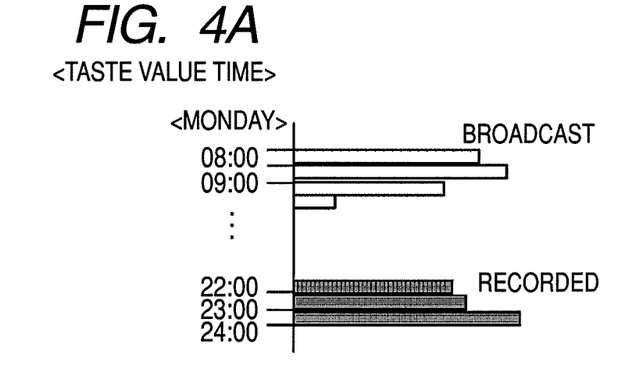
FIGS. 4A to 4C show diagrams depicting images of classifying items of attribute information in a viewing history database.
Figure 4B:
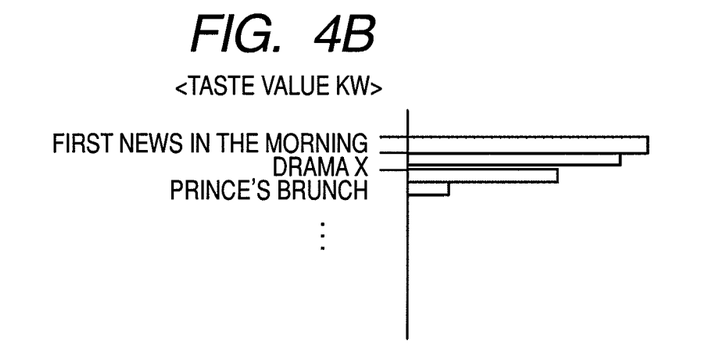
Figure 4C:
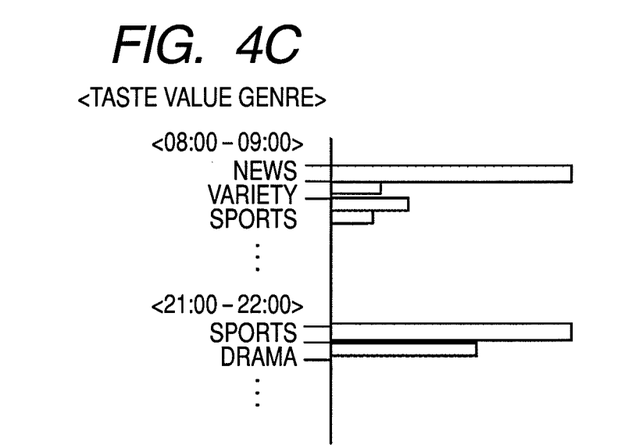

As shown in FIG. 3, for example, the viewing history database 37 classifies and stores the types of watched video contents notified from the viewing history collecting part 36 at a predetermined sampling cycle at each of time periods on the individual days of the week. In addition, based on the types of notified video contents, the viewing history database 37 acquires attribute information corresponding to the watched video contents (such as broadcast channels, genres, titles, and keywords) from an EPG database 39 or from a content database 42, and classifies and stores them at each of time periods on the individual days of the week. Consequently, as shown in FIGS. 4A to 4C, the viewing history database 37 classifies and stores the types of video contents, keywords (titles), and genres corresponding to a viewing history at each of the time periods. In addition, the viewing history database 37 also maintains taste value vectors showing user's viewing behavior computed by a time frame taste value computing part 43 at each of the time frames on the individual days of the week.

An EPG data acquiring part 38 extracts EPG data from television broadcast signals, and outputs it to the EPG database 39. The EPG database 39 stores therein EPG data inputted from the EPG data acquiring part 38. In addition, the stored EPG data is maintained until a predetermined period elapses after the corresponding broadcast content is broadcast. Then, the EPG data is deleted.

A content information collecting part 40 acquires attribute information of video contents (recorded contents or on-demand contents) maintained in the video recorder 11 and the STB 12 connected thereto through the interface 41, and outputs them to the content database 42. In addition, the content information collecting part 40 may acquire attribute information of recorded contents and on-demand contents from a predetermined server on the network 13.

The content database 42 maintains attribute information corresponding to video contents maintained in the video recorder 11 and the STB 12. In addition, the content database 42 also maintains evaluation value vectors of video contents computed by an evaluation value computing part 44.

In addition, video contents (recorded contents or on-demand contents) themselves maintained in the video recorder 11 and the STB 12 may be acquired by the content information collecting part 40, and maintained in the content database 42.

The time frame taste value computing part 43 references to user's viewing history stored in the viewing history database 37, computes a taste value indicating user's viewing behavior (for example, this user frequently watches broadcast contents belonging to the genre news, or this user frequently watches recorded contents belonging to the genre variety) at each of the time frames on the individual days of the week (for example, a single time frame from eight o'clock to nine o'clock on Monday), and maintains the computed result in the viewing history database 37.

More specifically, for example, the taste value is expressed as a vector having a plurality of dimensions (hereinafter, referred to as a taste value vector), and generates a taste value vector (the broadcast content, recorded content, on-demand content, news, drama, variety, movie, and so on) as the individual dimensions of the taste value vector are associated with the categories of video contents, and the types of genres. Then, the values of the individual dimensions of the taste value vector are increased in accordance with the user watching video contents.

In addition, the value to be increased may be changed depending on the watching time in the time frame. In addition, the value to be increased may be changed depending on the freshness of the viewing history.

For example, in the case in which there is no viewing history of a video content in the relevant time frame, the taste value vector is zero vector. However, when the viewing history of a broadcast content of the genre news is generated in the relevant time frame, the taste value vector is (1, 0, 0, 1, 0, 0, 0, ... ), and furthermore, when the viewing history of an on-demand content of the genre movie is generated in the relevant time frame, the taste value vector is updated to (1, 0, 1, 1, 0, 0, 1, ... ). In addition, when the viewing history of a broadcast content of the genre movie is further generated, the taste value vector is updated to (2, 0, 1, 1, 0, 0, 2, ... ).

In addition, in addition to seven items including the categories of video contents and the types of genres described above, the individual dimensions of the taste value vector are associated with the channel of the broadcast content and the keyword contained in the title.

The evaluation value computing part 44 references to the taste value vector at each of the time frames on the individual days of the week maintained in the viewing history database 37, detects a time frame having the magnitude of the taste value vector being a predetermined value or greater, and generates the evaluation value vector of each of the broadcast contents to be broadcast in the detected time frame. More specifically, as similar to the taste value vector, for example, the evaluation value vector of a broadcast content of the genre news (1, 0, 0, 1, 0, 0, 0, ... ) is generated, and maintained in the EPG database 39.

In addition, as similar to the evaluation value vector for the broadcast content, the evaluation value computing part 44 generates evaluation value vectors corresponding to the recorded content and the on-demand content, and maintains them in the content database 42.

The viewing schedule generating part 45 normalizes the taste value vector for the time frame having the magnitude of the taste value vector indicating user's viewing behavior being a predetermined value or greater, and then computes an Euclidean distance as a similarity to the evaluation value vector of each of the broadcast contents to be broadcast in the time frame. Then, in the individual broadcast contents to be broadcast in the time frame, the viewing schedule generating part 45 generates a viewing schedule in which a broadcast content having an Euclidean distance between the normalized taste value vector and the evaluation value vector is arranged in the relevant time frame, the Euclidean distance being equal to or greater than a predetermined threshold and the shortest.

In addition, the viewing schedule generating part 45 detects such a time frame on the viewing schedule that the time frame has no broadcast content arranged because the magnitude of the taste value vector indicating user's viewing behavior is a predetermined value or greater but the Euclidean distance between the evaluation value vector of each of the broadcast contents to be broadcast in the time frame and the normalized taste value vector is below a predetermined threshold. Then, the viewing schedule generating part 45 computes the Euclidean distance as the similarity between the normalized taste value vector of the detected time frame and the evaluation value vectors of the recorded content and the on-demand content, and arranges the recorded content or the on-demand content having the computed Euclidean distance that has a predetermined threshold or below and the shortest in the relevant time.

However, in the case in which there is a time frame in which a user sets a video content scheduled to watch (for example, in the case in which there is a recorded content for a recording preselect by moving a broadcast content to a given time frame on the viewing schedule (the detail will be described later with reference to FIG. 8)), the viewing schedule generating part 45 gives the time frame first priority to generate a viewing schedule.

The viewing schedule thus generated is supplied from the viewing schedule generating part 45 to the output control part 34, and displayed on the display 35*a*. In addition, the generated viewing schedule may be outputted to the external devices of the television set 10 (for example, a computer connected over the network 13).

In addition, for the method of analyzing user's taste values based on the user's viewing history and the method of computing the evaluation values of the individual video contents, the method of computing the similarity between the user's taste value and the evaluation value of the video content is not limited to the method described above, to which a given method can be applied.

Next, the operation of the content viewing system 1 will be described.

Figure 5:
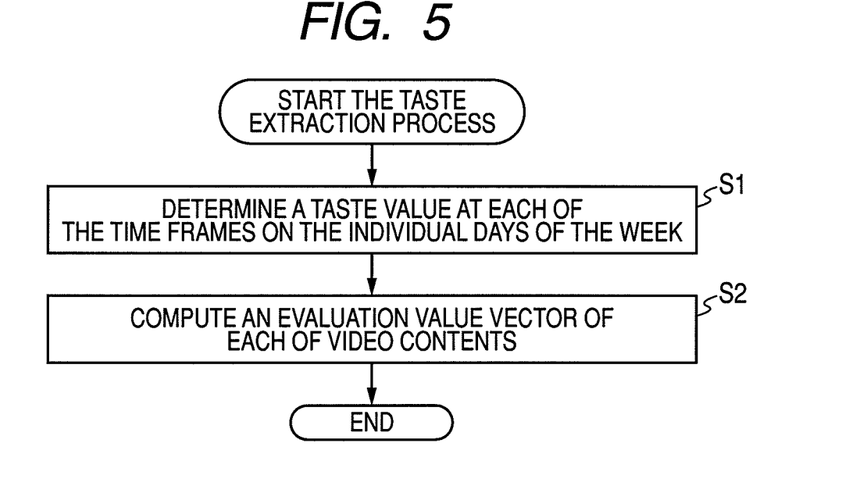
FIG. 5 shows a flow chart illustrative of a taste extraction process.

First, a taste extraction process performed prior to generating a viewing schedule will be described with reference to FIG. 3 and a flow chart shown in FIG. 5. This taste extraction process is automatically performed at a predetermined timing about once a day, for example (for example, at the time at which no video content is watched).

In addition, as the premise of performing this taste extraction process, the viewing history collecting part 36 monitors user manipulations all the time based on the manipulation signal generated by the manipulating part 31, and notifies the viewing history database 37 about the type of watched video content (the categories of the broadcast content, the recorded content, and the on-demand content) at a predetermined sampling cycle (for example, a ten minute cycle), and based on this notification, the viewing history database 37 acquires attribute information corresponding to a video content being watched (such as a broadcast channel, a genre, a title, and keywords) from the EPG database 39 or the content database 42, and classifies and stores the type of the video content and the attribute information at each of time periods on the individual days of the week.

In Step S1, the time frame taste value computing part 43 references to the user's viewing history stored in the viewing history database 37, computes a taste value vector indicating user's viewing behavior at each of the time frames on the individual days of the week, and maintains the computed result in the viewing history database 37.

In Step S2, the evaluation value computing part 44 references to the taste value vector at each of the time frames on the individual days of the week maintained in the viewing history database 37, detects a time frame having the magnitude of the taste value vector being a predetermined value or greater, and generates the evaluation value vector of each of the broadcast contents to be broadcast in the detected time frame. More specifically, as similar to the taste value vector, for example, the evaluation value computing part 44 generates the evaluation value vector of a broadcast content of the genre news (1, 0, 0, 1, 0, 0, 0, . . . ), and maintains it in the EPG database 39. As described above, the discussion of the taste extraction process is ended.

Figure 6:
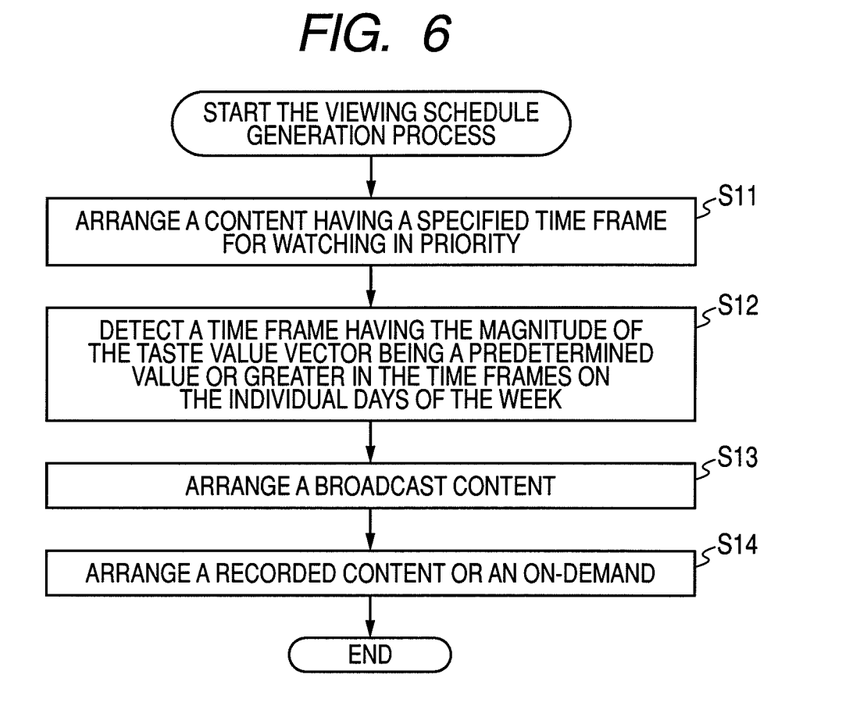
FIG. 6 shows a flow chart illustrative of a viewing schedule generation process.

Next, a process for generating a viewing schedule based on the taste value vector and the evaluation value vector computed in the taste extraction process (hereinafter, referred to as a viewing schedule generation process) will be described with reference to a flow chart shown in FIG. 6.

This viewing schedule generation process is performed at a predetermined timing about once a day, for example (at the time at which a user does not watch any video contents).

In Step S11, in the case in which there is a time frame in which a user sets a video content scheduled to watch, the viewing schedule generating part 45 arranges the video content set by the user in the time frame on a viewing schedule.

In Step S12, the viewing schedule generating part 45 detects a time frame having the magnitude of the taste value vector indicating user's viewing behavior being a predetermined value or greater. In Step S13, the viewing schedule generating part 45 normalizes the taste value vector of the time frame detected in Step S12, and then computes a Euclidean distance to the evaluation value vector of each of the broadcast contents to be broadcast in the time frame. Then, in the individual broadcast contents to be broadcast in the time frame, the viewing schedule generating part 45 arranges a broadcast content having the Euclidean distance between the normalized taste value vector and the evaluation value vector in the relevant time frame on the viewing schedule, the Euclidean distance being equal to a predetermined threshold or below and the shortest.

Figure 9:
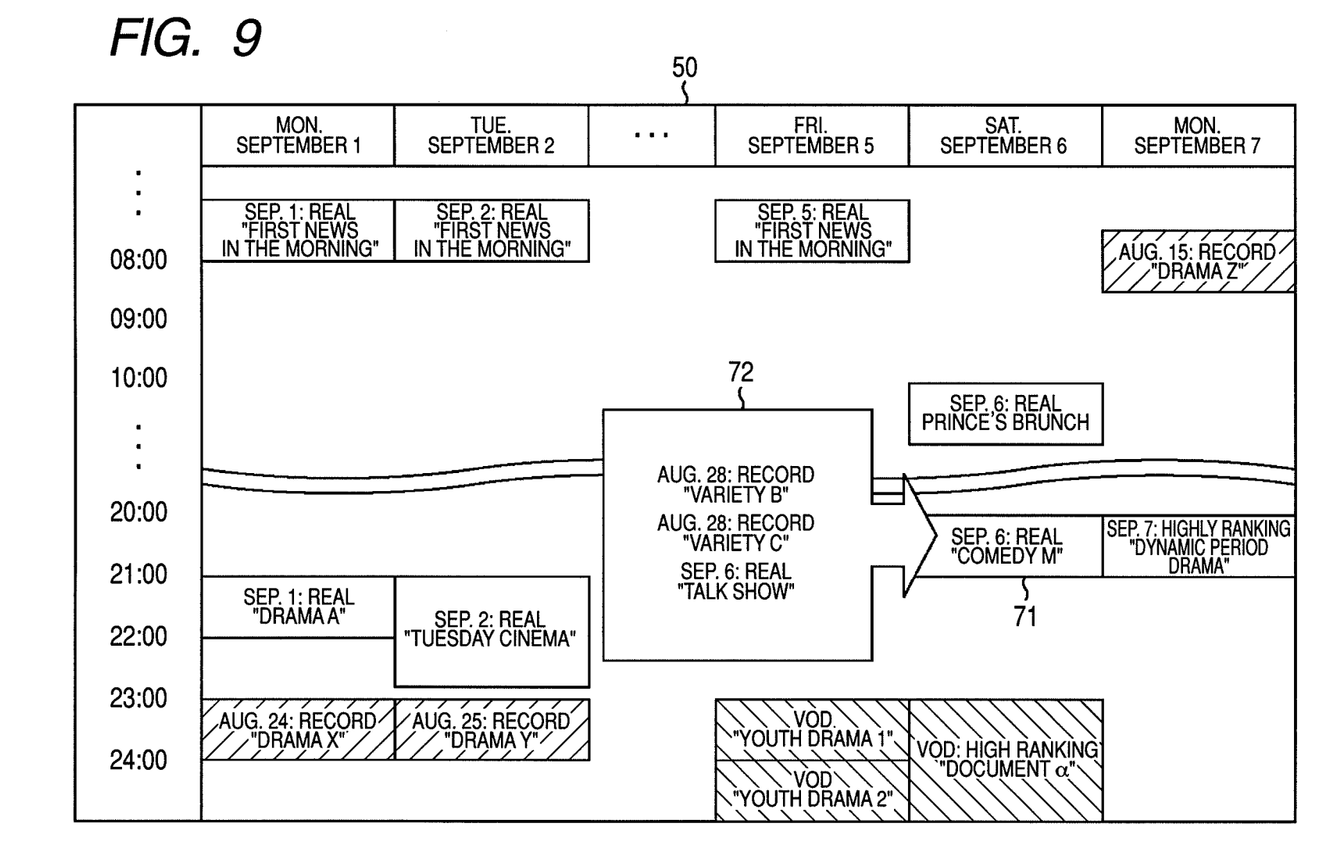
FIG. 9 shows a diagram depicting an exemplary display of next candidates according to the viewing schedule.

In addition, in Step S13, in the broadcast contents for which the Euclidean distance between the normalized taste value vector and the evaluation value vector in the time frames detected in Step S12, for a predetermined number of broadcast contents having the computed Euclidean distance that is equal to a predetermined threshold or below and the second shortest from the shortest side, they are not arranged in the relevant time frame on the viewing schedule at this stage, but they are stored as candidates for being arranged in the relevant time frame for use in display on a pop-up window 72 (FIG. 9).

In Step S14, in the time frame in which no broadcast content is arranged in Step S13 in the time frames detected in Step S12, the viewing schedule generating part 45 computes an Euclidean distance between the normalized taste value vector and the evaluation value vectors of the recorded content and the on-demand content. The viewing schedule generating part 45 arranges a recorded content or an on-demand content having the computed Euclidean distance that is a predetermined threshold or below and the shortest in the relevant time frame on the viewing schedule.

The generated viewing schedule is maintained in the viewing schedule generating part 45. In the case in which a user makes a manipulation to instruct showing the viewing schedule, the viewing schedule is supplied from the viewing schedule generating part 45 to the output control part 34, and displayed on the display 35*a*.

As described above, the discussion of the viewing schedule generation process is ended.

In the viewing schedule generation process as discussed above, the video content is arranged only in the time frame having the magnitude of the taste value vector indicating user's viewing behavior being a predetermined value or greater. Thus, such an event can be suppressed that a user is recommended to watch a video content in the time period in which the user has not watched any video contents on the television set 10, or in the time frame in which noticeable viewing behavior has not been acquired.

In addition, in the viewing schedule generation process, the broadcast content broadcast in real time is arranged in priority in the time frame having the magnitude of the taste value vector indicating user's viewing behavior being a predetermined value or greater more than the recorded content and the on-demand content which are already stored and can be watched any time. Therefore, such an event can be prevented that a user fails to watch the broadcast content matched with user's tastes.

Next, a plurality of exemplary displays of the viewing schedule will be described with reference to FIGS. 7 to 11.

Figure 7:
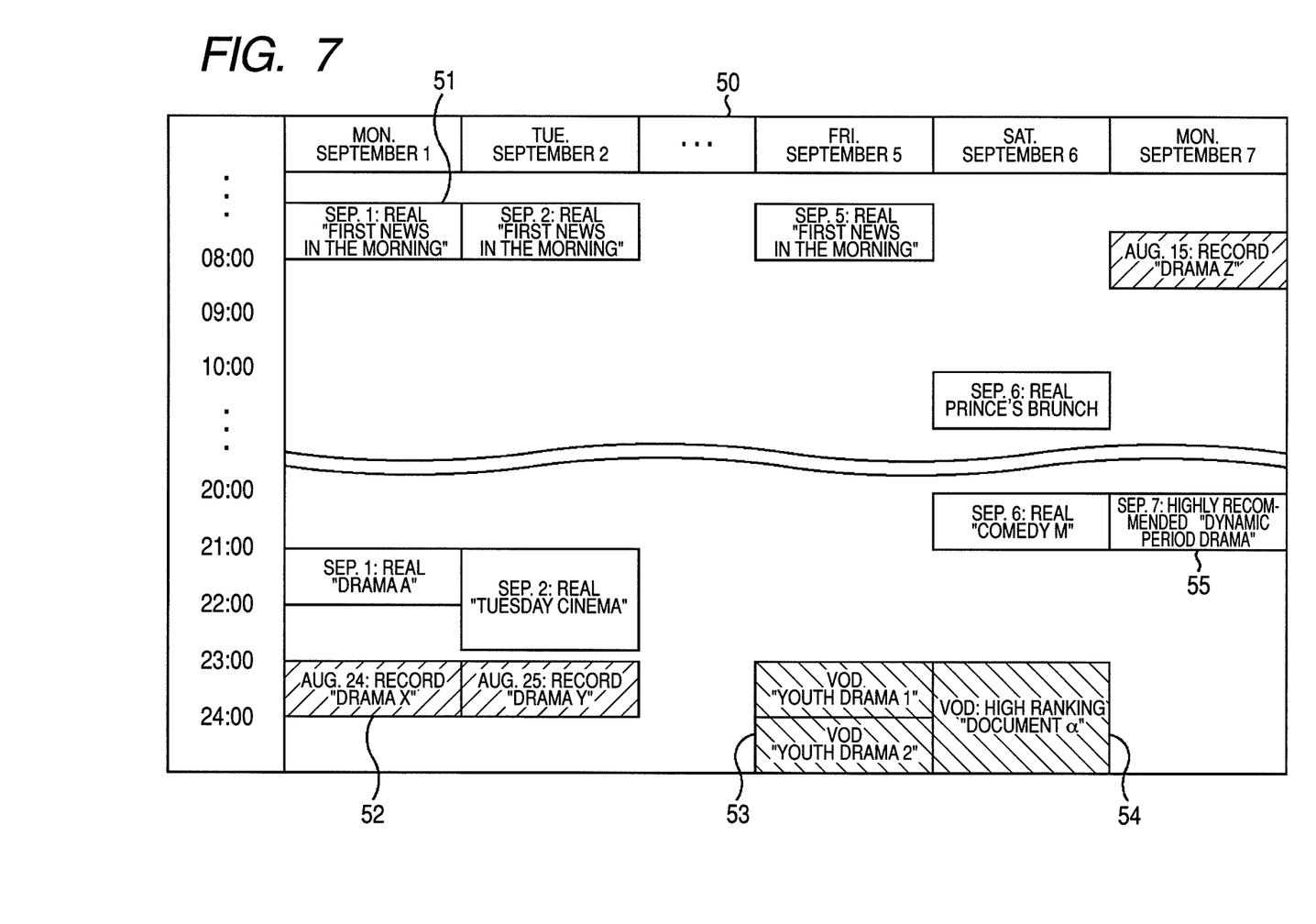
FIG. 7 shows a diagram depicting a first exemplary display of a viewing schedule.

FIG. 7 shows a first exemplary display of the viewing schedule. In a viewing schedule 50 that is the first exemplary display, the horizontal axis depicts the date (days of the week), the vertical axis depicts the time of day, and in the time frame specified by a day of the week on the horizontal axis and the time of day on the vertical axis, the title of the video content recommended to watch is shown. In addition, it is unnecessary to display contents for one week on the horizontal axis in a single screen and for 24 hours on the vertical axis. The screen may be scrolled in the lateral direction or in the vertical direction for display, or the screen may be split into a plurality of pages for display.

For example, in time frames 51, the broadcast content "first news in the morning" is arranged. This is according to the result of the viewing behavior obtained based on the user's viewing history that a user watches the broadcast content "first news in the morning" until eight o'clock in the morning on weekdays, for example.

In the case of the broadcast content, in the time frame, the broadcast day, the title, and text or a mark indicating that the content is a real time broadcast content (in the case shown in FIG. 7, "Real") are shown. In addition, instead of text or a mark indicating that the content is a real time broadcast content, or in addition to text or a mark, the time frame may be depicted in a predetermined color for display.

In addition, for example, in time frames 52, the recorded content "drama X" is arranged. This is according to the result of the viewing behavior obtained based on the user's viewing history that a user watches the recorded content belonging to the genre drama from 11 o'clock to 12 o'clock on Monday night, for example.

In the case of the recorded content, in the time frame, text or a mark indicating the recording day (broadcast day), the title, and the content being the recorded content (in the case shown in FIG. 7, "Record") is shown. In addition, instead of text or a mark indicating that the content is the recorded content, or in addition to text or a mark, the time frame may be depicted in a predetermined color different from the color indicating the broadcast content for display.

Moreover, for example, in time frames 53, the on-demand contents "youth drama 1" and "youth drama 2" are arranged. This is according to the result of the viewing behavior obtained based on the user's viewing history that a user watches the on-demand content belonging to the genre drama from 11 o'clock on Friday night to 1 o'clock midnight, for example.

In the case of the on-demand content, in the time frame, text or a mark indicating the title, and the content being the on-demand content (in the case shown in FIG. 7, "VOD") is shown. In addition, instead of text or a mark indicating that the content is the on-demand content, or in addition to text or a mark, the time frame may be depicted in a predetermined color different from the color indicating the broadcast content or the recorded content for display.

In addition, since the viewing schedule 50 is different from a normal program guide, as shown in the drawing, there may be time frames in which no video contents are arranged. As described above, in blank time frames, regardless of user's viewing behavior, a broadcast content expected to have a high rating and an on-demand content recommended by the video on-demand service side may be arranged.

For example, in a time frame 54, the on-demand content "Document α" is arranged. This content is a recommended one as a high ranking on-demand content from the video on-demand service side.

In this case, in the time frame, text or a mark indicating the title, and the content being the on-demand content (in the case shown in FIG. 7, "VOD"), and text or a mark indicating that the content is a recommended one (in the case shown in FIG. 7, "high ranking") are shown. In addition, instead of text or a mark indicating that the content is the on-demand content or a recommended one, or in addition to text or a mark, the time frame may be indicated in a predetermined color different from other colors for display.

In addition, for example, in a time frame 55, the broadcast content "dynamic period drama" is arranged. This content is a recommended one as a broadcast content expected to have a high rating from EPG data and a predetermined server.

In this case, in the time frame, the broadcast day, text or a mark indicating the title and the content being the recommended broadcast content because the high rating is expected (in the case shown in FIG. 7, "highly recommended") are shown. In addition, instead of text or a mark indicating that the content is the recommended broadcast content because the high rating is expected, or in addition to text or a mark, the time frame may be indicated in a predetermined color for display.

In addition, the viewing schedule 50 is one not only proposing video contents and the time frames to watch the video contents to a user but also functioning as a user interface for inputting recording preselect manipulations.

Figure 8:
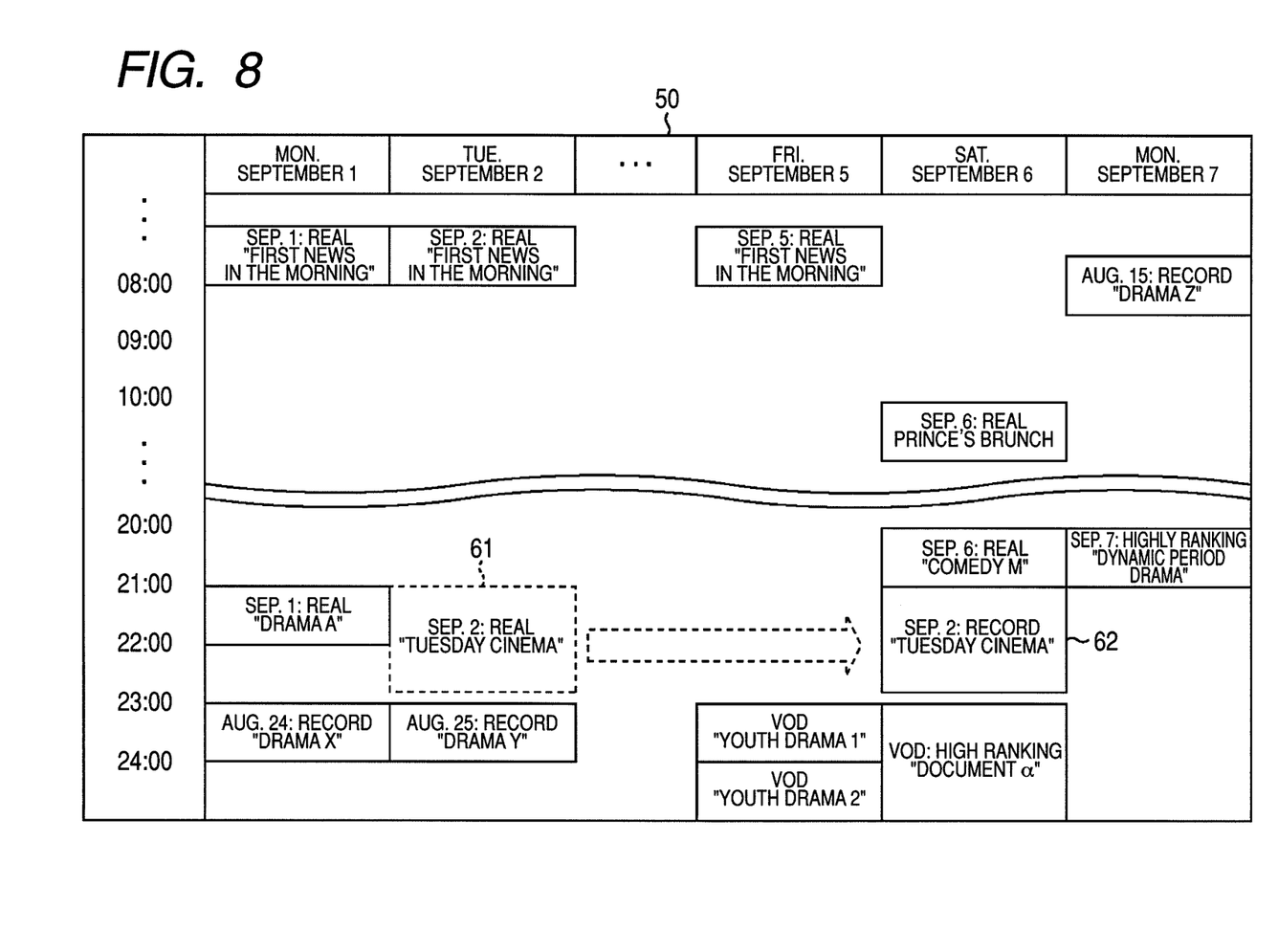
FIG. 8 shows a diagram illustrative of a recording preselect function according to the viewing schedule.

More specifically, for example, as shown in FIG. 8, when the broadcast content "Tuesday cinema" arranged in a time frame 61 on September 2 is moved to a time frame 62 on September 6 by a predetermined moving manipulation (for example, drag and drop, or cut and paste), in response to this moving manipulation, the recording preselect of the broadcast content "Tuesday cinema" to be broadcast in the time frame 61 on September 2 is made to the video recorder 11. Then, the display of the time frame 61 is deleted, and the recorded content "Tuesday cinema" can be arranged in the time frame 62. As described above, the time frame and the video content specified by a user to watch are given higher priority on the viewing schedule 50 even though the viewing schedule 50 is updated after this.

In addition, for example, when a predetermined manipulation is made (for example, a "recording preselect button" provided on a remote controller is pressed down) in the state in which the time frame is selected in which the recorded content is arranged (for example, the time frame 52), a recording preselect is made to the closest broadcast content having similar attribute information. Thus, a recording preselect can be readily made to the next time broadcast content of a series drama.

Furthermore, for example, when a predetermined manipulation is made (for example, a "download button" provided on the remote controller is pressed down) in the state in which the time frame is selected in which the on-demand content is arranged (for example, the time frame 53), such setting is performed that at the time at which the relevant on-demand content is updated by the server, the updated video content is automatically downloaded. Therefore, the updated version of the on-demand content such as a series drama can be readily downloaded.

In addition, the viewing schedule 50 has a function of recommending a single video content in each of the individual time frames as well as recommending a plurality of video contents. More specifically, for example, as shown in FIG. 9, in a time frame 71 on September 6, the broadcast content "Comedy M" is arranged. When a predetermined manipulation is made (for example, a "next candidate button" provided on the remote controller is pressed down) in the state in which the time frame 71 is selected, the pop-up window 72 is superimposed in response to this manipulation. On the pop-up window 72, a plurality of video contents is displayed in order of contents matched with viewing behavior in the time frame 71. When a user selects one of the video contents displayed on the pop-up window 72, the broadcast content "Comedy M" arranged in the time frame 71 is replaced by the selected video content. As described above, the time frame and the video content specified by a user to watch are given higher priority on the viewing schedule 50 even though the viewing schedule 50 is updated after this.

Figure 10:
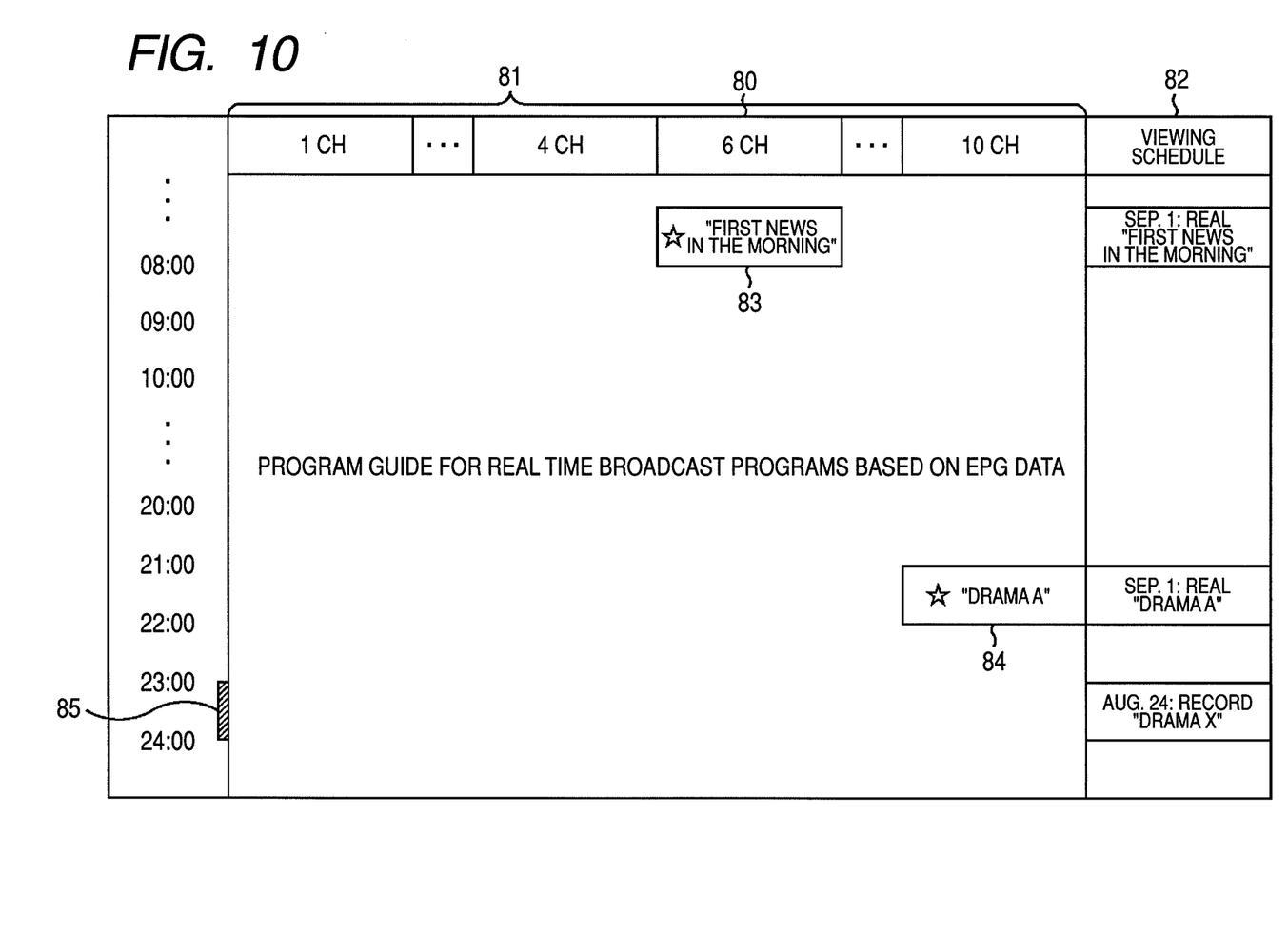
FIG. 10 shows a diagram depicting a second exemplary display of the viewing schedule.

Next, FIG. 10 shows a second exemplary display of the viewing schedule. A viewing schedule 80 that is the second exemplary display is configured of an area 81 in which a program guide of broadcast contents for one day is displayed and an area 82 in which a viewing schedule for one day is displayed, and the horizontal axis depicts the channel and the vertical axis depicts the time period. In other words, the viewing schedule 80 is one that the program guide of typical television programs is added with the virtual channels corresponding to a viewing schedule for one day.

In addition, in FIG. 10, representations in the area 81 are omitted because of the drawing, but actually, the broadcast contents are arranged with no clearance in accordance with the broadcast schedule.

According to the display method, this method is suited for browsing and selecting broadcast contents to be broadcast in the time period in which contents are arranged in the virtual channels. Although the content originally recommended is a content that a user is highly likely to watch, the user does not sometimes watch the recommended content and desires to select another content. Since the time period in which the contents are arranged in the virtual channels is the time period in which a user tends to watch some content, the user also browses the broadcast content to be broadcast in the time period according to the display of the program guide, whereby the user can readily select a content.

In addition, in order to more effectively browse broadcast programs to be targets for selection by a user, only in the time periods in which contents are displayed in the virtual channels may be displayed.

More specifically, in FIG. 10, as the display ranging from 09:00 to 21:00 is omitted, the time periods ranging from 07:00 to 08:00 and 21:00 to 24:00 and only the target time periods tomorrow and the day after tomorrow are displayed with no space. Thus, only the contents to be targets for selection can be efficiently browsed on a single screen.

In the broadcast contents of the program guide displayed in the area 81, for those adopted in a viewing schedule 82, text or a mark indicating this adoption is displayed (for example, star marks on time frames 83 and 84 shown in FIG. 10). In addition, in the case in which the recorded content or the on-demand content is adopted in the viewing schedule 82, a predetermined mark 85 is displayed on the vertical axis of the viewing schedule 80 corresponding to that time frame.

Figure 11:
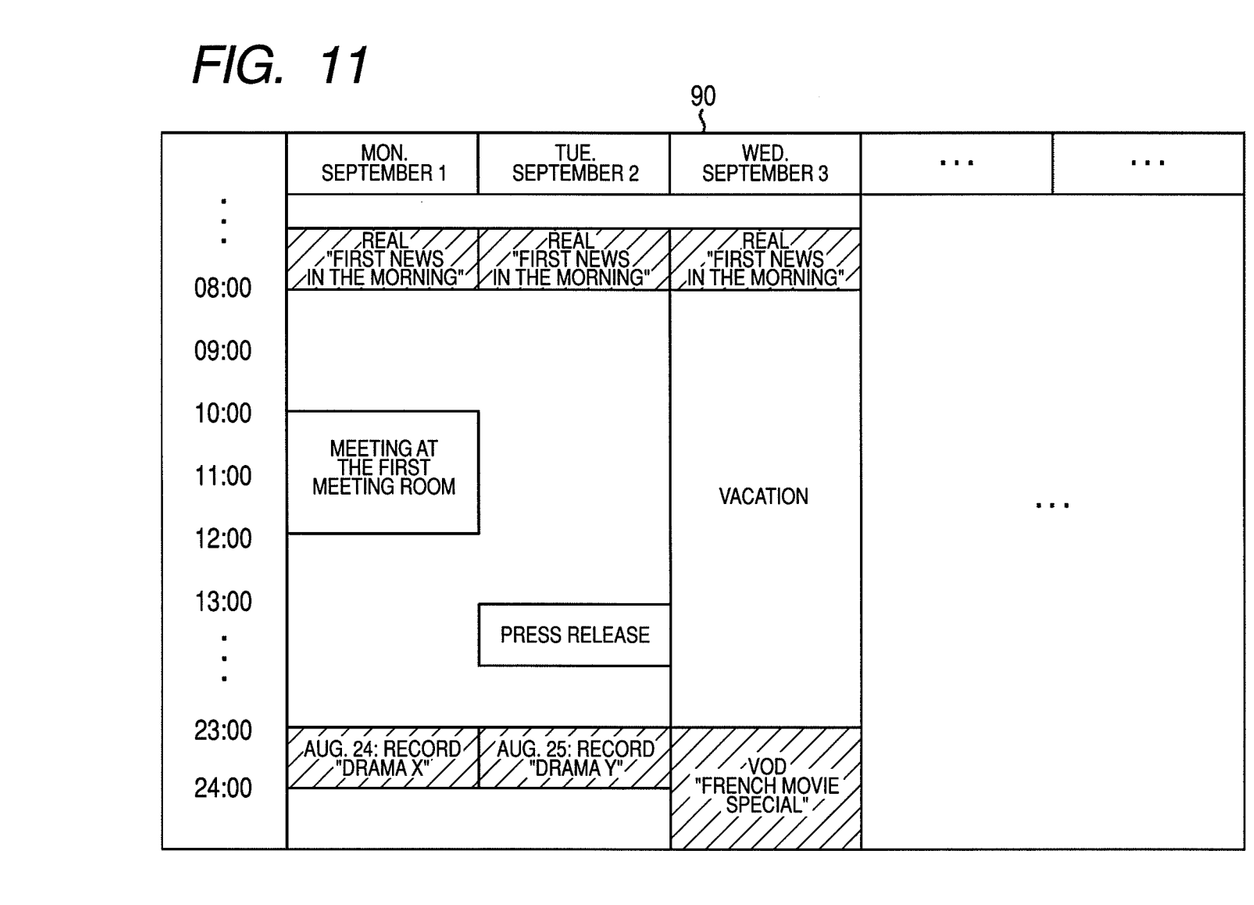
FIG. 11 shows a diagram depicting a third exemplary display of the viewing schedule.

Next, FIG. 11 shows a third exemplary display of the viewing schedule. A viewing schedule 90 that is the third exemplary display is a viewing schedule which is outputted to an external device of the television set 10 (for example, a computer connected over the network 13) and combined with an existing schedule in that external device. Of course, such a scheme may be possible that a scheduling function is provided to the television set 10 and the viewing schedule 90 that is the third exemplary display is displayed on the television set 10.

As discussed above, according to the embodiment of the invention, in consideration of user's lifestyle (more specifically, the viewing behavior of video contents), it is made possible that a viewing schedule of broadcast contents, recorded contents, and on-demand contents is decided and proposed to the user.

Therefore, the user references to this viewing schedule to watch video contents, and then the user can watch video contents matched with his/her tastes with no waste of time and without failing to watch them.

A sequence of the process steps described above may be executed by hardware, or may be executed by software. In the case in which a series of the process steps is executed by software, a program configuring the software is installed in a computer incorporated in a dedicated hardware, or is installed from a program recording medium to a multi-purpose personal computer, for example, that can run various functions by installing various programs.

Figure 12:
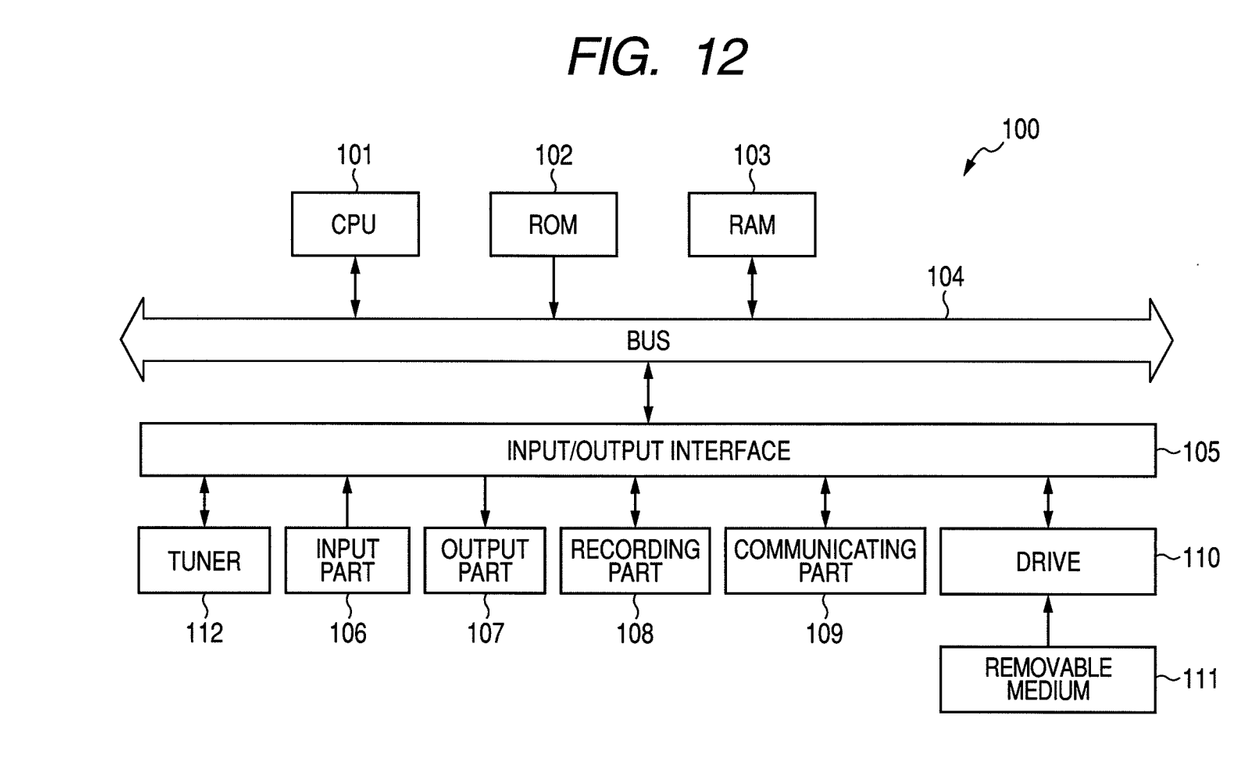
FIG. 12 shows a block diagram depicting an exemplary configuration of a computer to which an embodiment of the invention is adapted.

FIG. 12 shows a block diagram depicting an exemplary hardware configuration of a computer that executes the sequence of the process steps by a program.

In this computer 100, a CPU (Central Processing Unit) 101, a ROM (Read Only Memory) 102, and a RAM (Random Access Memory) 103 are connected to each other through a bus 104.

Furthermore, to the bus 104, an input/output interface 105 is connected. To the input/output interface 105, the following components are connected: an input part 106 formed of a keyboard, a mouse, and a microphone, an output part 107 formed of a display and a speaker, a storage part 108 formed of a hard disk or a non-volatile memory, a communicating part 109 formed of a network interface, and a drive 110 that drives a removable medium 111 such as a magnetic disk, an optical disk, a magneto-optical disk, or a semiconductor memory.

Moreover, to the input/output interface 105, a tuner 112 is connected for receiving television broadcast signals.

In the computer thus configured, for example, the CPU 101 loads a program stored in the storage part 108 to the RAM 103 through the input/output interface 105 and the bus 104 for execution, whereby the sequence of the process steps is performed.

In addition, the program executed by the computer may be a program for processing in a time series in order described in the specification, or may be a program for processing in parallel, or at a necessary timing when called, for example.

In addition, the program may be processed in a single computer, or may be processed by a plurality of computers in distributed processing. Furthermore, the program may be forwarded to a remote computer for implementation.

In addition, in the specification, the system describes the overall apparatus configured of a plurality of devices.

Moreover, embodiments of the invention are not limited to the embodiments described above, which can be modified within the scope not deviating from the teaching of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus which presents a viewing schedule of a video content to a user, the apparatus comprising:
   at least one processor configured to:
   acquire a broadcast schedule of a broadcast content to be broadcast;
   acquire information about a recorded content that has been recorded and an on-demand content that has been downloaded;
   collect user's viewing history;
   compute, for each time frame on a particular day of a week from at least a subset of a plurality of time frames, a taste value comprising a plurality of dimensions indicating user's viewing behavior in previous instances of the respective time frame in the subset based on the collected user's viewing history, wherein at least one first dimension of the taste value is associated with the broadcast content and at least one second dimension of the taste value is associated with the recorded content;
   compute, for broadcast content scheduled to be broadcast in respective time frames of the plurality of frames, for the recorded content and for the on-demand content, a respective evaluation value comprising a mathematical quantity indicating a feature of the broadcast content, the recorded content, and the on-demand content; and
   generate the viewing schedule indicating, for at least one time frame of the plurality of time frames, proposed content selected from the broadcast content, the recorded content, and the on-demand content based on a degree of similarity between the taste value computed for the at least one time frame and the respective corresponding evaluation values computed for the broadcast content, the recorded content, and the on-demand content; and
   display the generated viewing schedule so that the broadcast content, the recorded content, and the on-demand content are displayed on a same time axis;
   wherein, the evaluation value computed for the broadcast content is computed for the time frame having a taste value that is equal to or greater than a threshold.

2. The information processing apparatus according to claim 1, wherein the display device displays the generated viewing schedule in a two-dimensional matrix in which one of a vertical axis and a horizontal axis depicts a date, and the other depicts a time of day.

3. The information processing apparatus according to claim 1, wherein the display device displays the generated viewing schedule as virtual channels provided on a television program guide.

4. The information processing apparatus according to claim 1, wherein the at least one processor is further configured to: set a recording preselect in response to a predetermined manipulation to the displayed viewing schedule.

5. The information processing apparatus according to claim 1, wherein:
   the taste value is represented as a vector having the plurality of dimensions.

6. The information processing apparatus according to claim 5, wherein:
   a value of each dimension in the vector is increased with time based on user's watching content.

7. The information processing apparatus according to claim 1, wherein:
   the plurality of dimensions of the taste value comprise dimensions each associated with a respective type of genre.

8. The information processing apparatus according to claim 1, wherein:
   at least one third dimension of the taste value is associated with the on-demand content.

9. The information processing apparatus according to claim 1, wherein the method further comprises:
   if no content is selected for a time frame, recommending content for viewing during the time frame.

* * * * *